US006789211B2

(12) United States Patent
Phillips

(10) Patent No.: US 6,789,211 B2
(45) Date of Patent: *Sep. 7, 2004

(54) STORING IN A RESERVED MEMORY LOCATION DATA INDICATIVE OF A STACK LOCATION WHICH STORES THE ENTRY POINT OF A DYNAMICALLY LOADED FILE

(75) Inventor: Mark Phillips, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 503 days.

This patent is subject to a terminal disclaimer.

(21) Appl. No.: 09/778,580

(22) Filed: Feb. 7, 2001

(65) Prior Publication Data

US 2001/0034857 A1 Oct. 25, 2001

(30) Foreign Application Priority Data

Apr. 20, 2000 (GB) .............................................. 0009943

(51) Int. Cl.[7] .............................................. G06F 11/00
(52) U.S. Cl. ............................ 714/5; 714/38; 717/124
(58) Field of Search ........................... 714/5, 6, 30, 35, 714/726, 729, 747, 791, 38, 25, 27, 42; 717/130, 162, 124; 712/227; 709/331; 711/200

(56) References Cited

U.S. PATENT DOCUMENTS

| | | | |
|---|---|---|---|
| 4,866,665 A | * 9/1989 | Haswell-Smith | 714/35 |
| 5,175,828 A | * 12/1992 | Hall et al. | 709/331 |
| 5,394,544 A | 2/1995 | Motoyama et al. | 714/31 |
| 5,537,652 A | * 7/1996 | Friedl et al. | 711/111 |
| 5,561,766 A | 10/1996 | Kitamori | |
| 5,628,016 A | 5/1997 | Kukol | 717/140 |
| 5,715,387 A | 2/1998 | Barnstijn et al. | |
| 5,901,225 A | 5/1999 | Ireton et al. | |
| 5,903,718 A | * 5/1999 | Marik | 714/38 |
| 5,915,083 A | * 6/1999 | Ponte | 714/30 |
| 5,933,820 A | * 8/1999 | Beier et al. | 707/1 |
| 6,226,759 B1 | * 5/2001 | Miller et al. | 714/6 |
| 6,249,907 B1 | * 6/2001 | Carter et al. | 717/129 |
| 6,311,326 B1 | * 10/2001 | Shagam | 717/128 |
| 6,314,530 B1 | * 11/2001 | Mann | 714/38 |
| 6,356,960 B1 | * 3/2002 | Jones et al. | 710/5 |
| 6,505,296 B2 | * 1/2003 | Morris et al. | 712/244 |
| 6,587,967 B1 | * 7/2003 | Bates et al. | 714/35 |

OTHER PUBLICATIONS

European Standard Search Report from Great Britain application No. 0009941, filed Apr. 20, 2000.
European Standard Search Report from Great Britain application No. 0009940, filed Apr. 20, 2000.
European Standard Search Report from Great Britain application No. 0009945, filed Apr. 20, 2000.
European Standard Search Report from Great Britain application No. 0009939, filed Apr. 20, 2000.

* cited by examiner

Primary Examiner—Robert Beausoliel
Assistant Examiner—Christopher S. McCarthy
(74) Attorney, Agent, or Firm—Lisa K. Jorgenson; William R. McClellan; Wolf, Greenfield & Sacks, P.C.

(57) ABSTRACT

To enable a processor connected to a host computer to run programs that are dynamically loaded by the host, a stack is loaded into its memory, and the location of the stack, or information enabling that location to be found are stored in a memory location reserved as a vector. The programs are then dynamically loaded into said memory; and a set location in the stack is used to store the entry point into the dynamically loaded file.

12 Claims, 4 Drawing Sheets

STORING IN A RESERVED MEMORY LOCATION DATA INDICATIVE OF A STACK LOCATION WHICH STORES THE ENTRY POINT OF A DYNAMICALLY LOADED FILE

FIELD OF THE INVENTION

The present invention relates to methods and apparatus for operating a digital signal processor or debugging a computer system.

BACKGROUND OF THE INVENTION

During development and testing of an embedded computer system, especially an embedded microprocessor-based computer system, it is normally necessary to connect the system to a host computer so that an engineer can debug the embedded system. Debugging software on the host computer provides access by the engineer into the embedded system. Typically, the engineer uses the host computer and debugging software to set break points which stop threads of execution on the target embedded system, monitor registers in the target, monitor memory states and monitor input and output data. The engineer may also restart threads which have been previously stopped and perform a variety of other tasks including rebooting the target computer using the host.

As used herein, the term 'digital signal processor' includes microprocessors in general and other like digitally operating processing devices.

It has been found desirable for a host to dynamically load a library of functions and subroutines to an embedded system, such that the digital signal processor of the embedded system is able to access the library when required. Examples of such a need are where the library contains work-round routines enable hardware bugs to be masked or otherwise avoided, and where the library must be accessed to enable communication for debugging or set-up purposes to be carried out.

One problem is that the dynamically loaded location must be readily available to an application being run on the embedded system.

It is accordingly an object of embodiments of the present invention to at provide a solution to this problem.

SUMMARY OF THE INVENTION

According to a first aspect of the present invention there is provided a method of operating a digital signal processor connected to a host system, the digital signal processor having a memory including a reserved storage location designated as a vector, the method comprising:

dynamically loading into said memory a stack;

storing in said reserved location information indicative of said stack location;

dynamically loading a computer file into said memory for use by said digital signal processor; and storing at a predetermined location in said stack data indicative of an entry point into said dynamically loaded file.

According to a second aspect of the present invention there is provided a method of debugging a computer system connected to a host computer, the computer system having a memory including a reserved storage location designated as a vector, the method comprising dynamically loading into said memory a stack;

storing in said reserved location information indicative of said stack location;

dynamically loading a computer file into said memory for use by said digital signal processor; and storing at a predetermined location in said stack data indicative of an entry point into said dynamically loaded file;

causing an application to run on said computer system whereby said application accesses said vector to thereby locate said entry point whereby said application calls a subroutine in said computer file.

BRIEF DESCRIPTION OF THE DRAWINGS

A preferred exemplary embodiment of the invention will now be described with reference to the accompanying drawings in which.

DESCRIPTION OF THE PREFERRED EMBODIMENT

Figure 1:
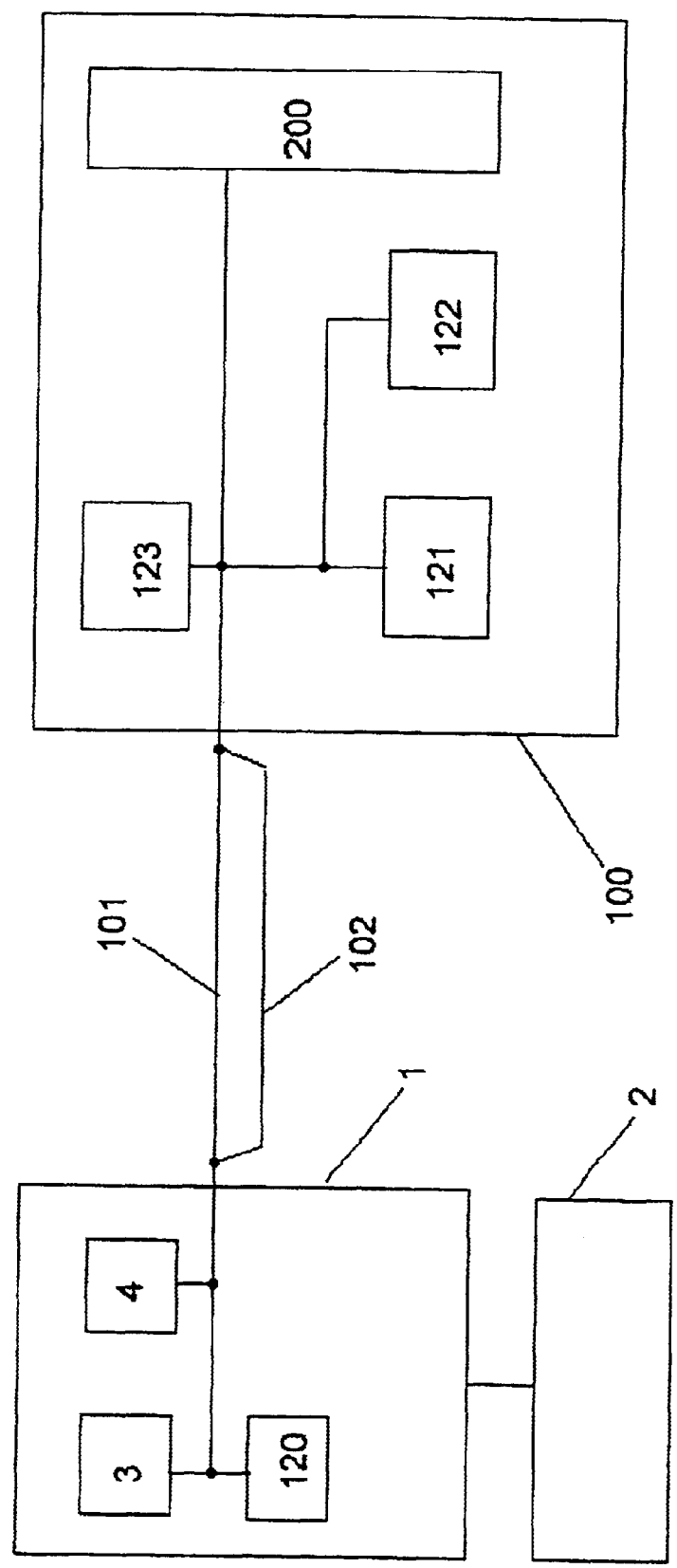
FIG. 1 shows a block diagram of a host computer connected to a target computer for downloading an input/output library.

In the various figures like reference numerals refer to like parts.

Referring first to FIG. 1, a host computer 1 includes an input device such as a keyboard 2 and runs debugging software 4 for a target embedded system 100, the host and target being connected via a communications link 101, 102. This link is shown figuratively in FIG. 1 as two separate paths with a first path 101 conveying data from the host machine 1 to the target machine 100 and a second path 102 connecting to the target computer 100 to the host computer 1. It will be understood that the link may be of any conventional type that allows two-way communication. Such communication need not be simultaneous. The target system typically includes a digital signal processor or other processing circuitry, hereinafter referred to as a digital signal processor.

The host computer further includes a file 3, hereinafter referred to as a library, containing a collection of subroutines and information that will be used by the target computer to implement a multilayered communication protocol over the physical link 101, 102.

The link 101 outgoing from the host computer 1 to the target computer 100 is shown figuratively as connected to four portions of the target system. These are a first application 121, a second application 122, a reset block 123, and the volatile memory 200 of the target system.

It will be understood by those skilled in the art that the debugging software 4 may communicate over the link 101 to interrogate or monitor the registers in the target, the memory in the target, to stop and restart threads of execution.

The applications 121, 122 may be stored in read only memory or may be downloaded via a separate link (not shown) at run-time, e.g. into RAM 200.

Figure 2:
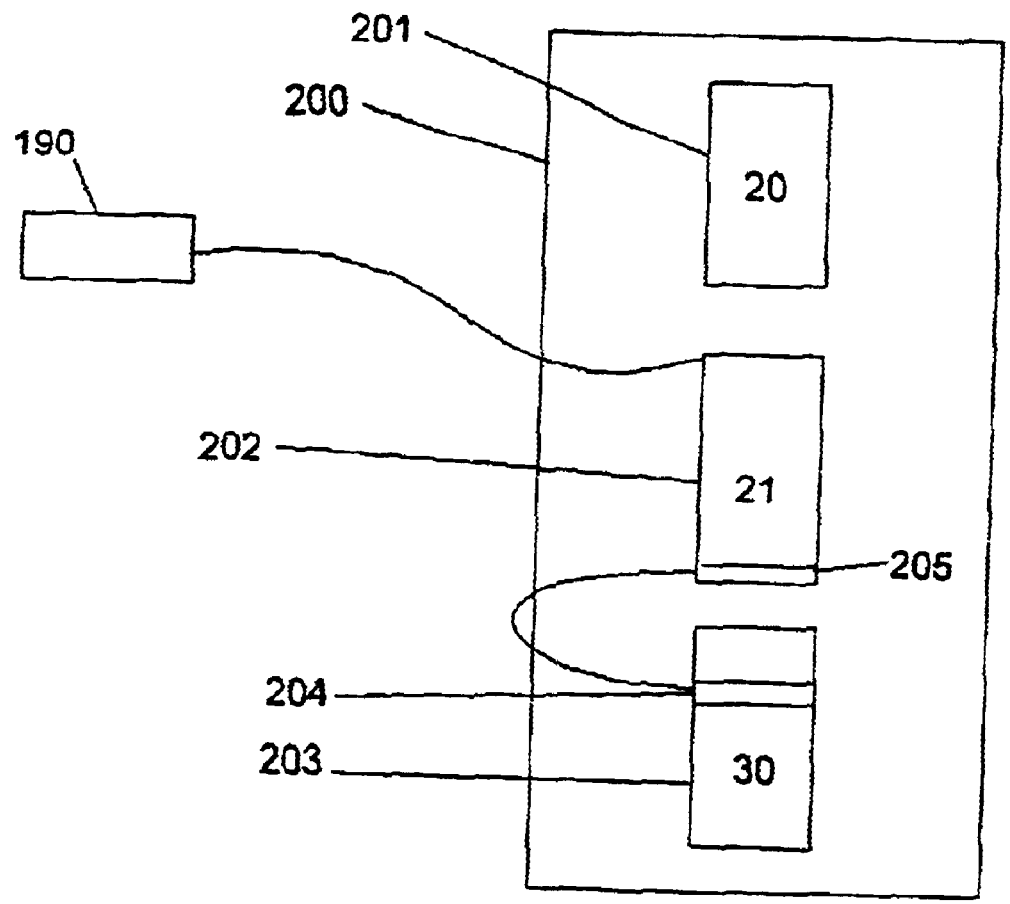
FIG. 2 shows a schematic partial view of the target system showing the use of a pointer to indirectly access an entry point of a dynamically loaded library.

Referring to FIG. 2, the target system 100 includes an exception handler 20 loaded into a memory area 201, the exception handler 20 having a stack 21 in a reserved area of memory 202 the stack including a reserved location 205. In the embodiment described, which has a negative-growing stack, the reserved location 205 is selected as the bottom of the stack. The host system 1 may dynamically load the exception handler stack into the target memory. The target includes a hard-wired location 190 accessible to both the target and the host, hereinafter referred to as a vector.

As used in this document, a vector is a reserved area, typically at a hard-wired location, used to contain address data of a key system entity. A pointer is a general holder of the address of a selected (arbitrary) entity.

At the start of debugging, the library 3 is accessed by the linker-loader 120 of the host which dynamically loads the library to a suitable vacant area of memory 203 of the target according to the usage of memory by applications, data and functions, to provide a loaded library 30 having an entry point 204 within the region of memory 203. At the time of loading the library 30 into memory, the linker-loader 120 determines where in the memory of the target to load the stack. The linker-loader stores at the bottom stack location 205, hereinafter referred to as the entry point pointer, information representing the entry point 204 and loads the location of the stack into the vector 190. It will be understood by those skilled in the art that the information stored by the vector 190 may be of various forms, including the absolute address of the exception handler stack 202 or other information such as an offset.

If the embedded system 100 is not connected to a host, no library will have been loaded and entry point pointer 205 is set to contain a predetermined value indicative of the fact that no library is available, as will be described below. This predetermined value may be a value that is not a valid address.

When an application performs input/output, the following events take place:
1. The application identifies the need to perform input/output, and calls a linked-in function setting up input/output data structures at the upper levels of the protocol.
2. The linked-in function looks for a valid address at location 205 by reading the contents of vector 190 to find the exception handler stack and offsetting to the entry point pointer 205. If the entry point vector 205 does not store a valid address but instead the "no library available" value, then the host is assumed to be disconnected. An appropriate error code is then produced.
3. If the address is valid, it is assumed to be that of the library entry point. A call is made to that entry point and the code at this address will determine whether the host is connected and whether input/output is enabled. The method of checking the library code is described later herein. If the code checks indicate either that no host is connected, or that input/output is not enabled, an appropriate error code will be determined stating the reason for input/output failure.
4. If the host is connected and input/output is enabled, the application will communicate with the debugger to carry out the input output operation and return an appropriate status code.

Figure 3:
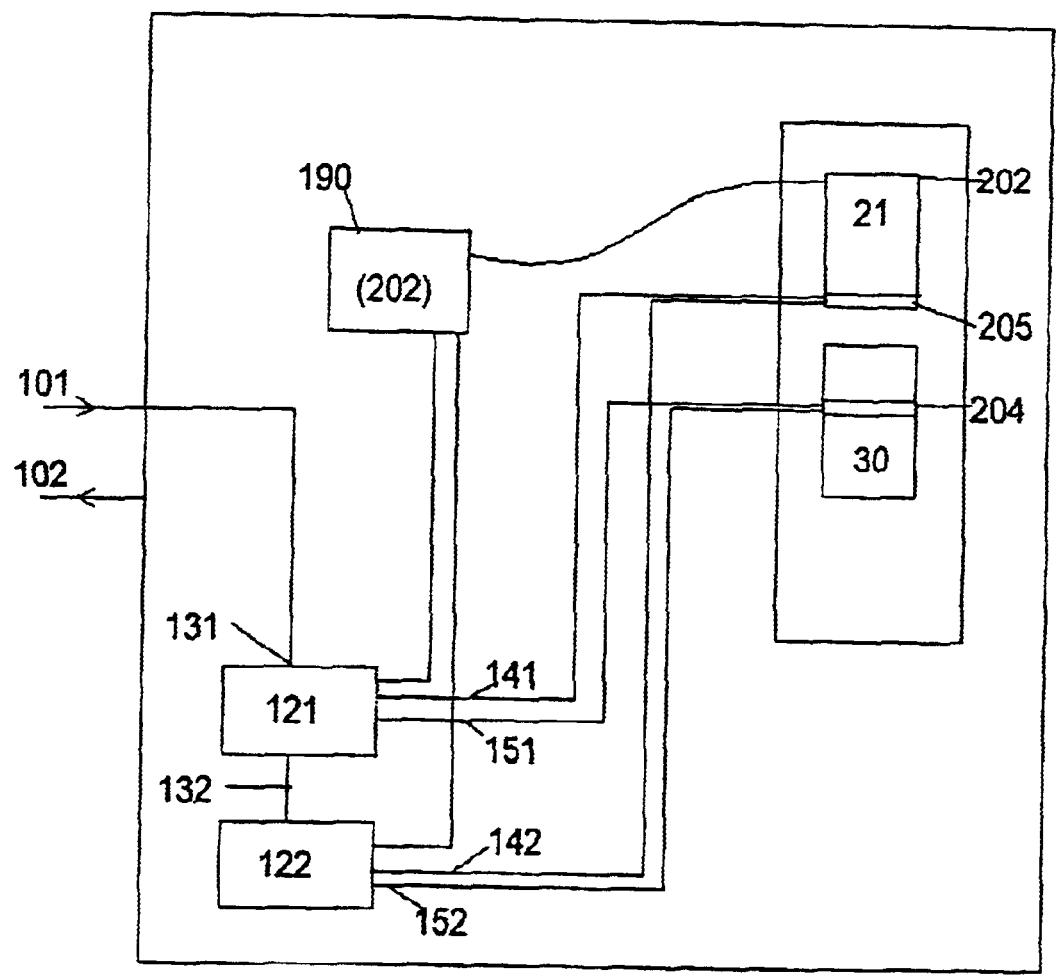
FIG. 3 shows a block diagram of a target computer showing how data communication is effected using the invention.

Referring now to FIG. 3, the first application 121 may be initiated by the host computer 1 at an input 131. If the first application 121 needs to input data from the host computer 1 then it must make use of the dynamic library 30. To do this, application 121 reads the vector 190 and from its contents accesses the address of the exception handler stack 202, offsets to the entry point pointer 205 which results in the entry point into the dynamic link library 30 being supplied to the application at input 141. The application fetches information from the dynamic link library 30 at terminal 151. The application 121 is thus able, by use of the required subroutines in the library 30 to "translate" information coming in over link 101 from the host computer.

If the first application needs to output information to the host computer, then a similar process applies.

Further inspection of FIG. 3 shows that the first application 121 is capable of starting the second application 122 over a path 132. If during execution of the second application 122 there is a requirement for the second application to input or output data from or to the host computer 1, the second application uses the vector 190 to load the entry point data from memory location 205 over the path 142 and accesses the library 30 over the path 152. This in turn enables the second application 122 to input or output data as required.

Each of the applications typically comprises a start up code. The system described uses a single region of memory 202 for the exception handler stack 21. However, where more than one application exists in the embedded system, each may use a different region of memory for the stack of its exception handler. If this occurs, then when a host is connected, a region of memory known to the host must be reserved for this stack and the vector of the target updated to point to this region. The consequence is that all applications use a single area of stack for the particular exception. This ensures that the host has a single stack area, which it will use for the linker-loader 120 to store the address information of the library 30.

Without these measures being taken, each of the stack regions will be valid for a particular time period and the host will be unable to determine which of these stack regions to write the relevant data to at any one time.

There are three ways in which an application may start. In the first, the host starts the application, in the second the application is started by the target following reset, eg power-up, and in the third, the application is started by another application, referred to here as the initiating application.

For the first, use of the dynamic link library is necessary.

For the second, the application should run correctly without recourse to the library, and if the application tries to call the library, an error should be indicated.

However, for the third, the provision of the dynamic link library depends on how the initiating application was started. If the initiating application was started by the host, then the dynamic link library should be made available: if the initiating application started after target reset, then no library should be needed. (It will of course be understood by those skilled in the art that a whole chain of applications may exist, in which case the decision depends on how the first in the chain started up)

To cope with the above situation, the embodiment initialises the contents of the entry point pointer 205 according to the following rules:

If the host has started the application, the application start up code assumes that the entry point pointer value is valid—i.e. the host has set the value stored by the entry point pointer 205 to point to a dynamic library, which the host has downloaded to the target.

If the application has been started following reset of the target, the application start up code will place the above-discussed "no library available" value in entry point pointer 205 indicating that there is no available dynamic library.

If the application has been started by an initialising application then:

a) If the host started the initialising application, then the value stored by entry point pointer 205 is considered valid and it is considered that there is a valid library in the system.

b) If however there is no host connected, or if the host did not start the initialising application, then it is necessary to reset the contents of 205 to the "no library available" special value.

To implement these rules, the target digital signal processor supports a mechanism whereby the host can set a single bit of state in a register of the target, which is initialised upon an input to reset logic 123, i.e., a processor reset. This bit is hereinafter referred to as the "host-connected bit" and typically resides in a processor register or a memory-mapped register.

As noted above, two system start-up situations exist:
1. Ordinary, where the target executes a reset sequence, such as power up, and starts executing code at an address fixed, for example by contents of ROM within the embedded digital signal processor.
2. Via the host, in which case the host controls the reset sequence and may also control the address of the first code to be executed.

If the digital signal processor is reset using the ordinary sequence, the host-connected bit is initialised by the digital signal processor reset-logic. The start up code of the first application to be executed reads the host-connected bit, and because it is initialised determines that the host is regarded as not connected. The code then sets the contents of memory location 205 to the no-library value.

If however the host starts the target, then:
1. The host resets the target and holds it in a suspended state.
2. The host downloads the exception handler stack and adjusts the vector to point to this stack.
3. The host downloads the input/output library to the target and sets the entry point pointer 205 in the stack to contain the entry-point to this library.
4. The host inverts the host-connected bit.
5. The host releases the target from its suspended state.

Note that the order may differ from the above. For example, the library may be dynamically loaded, whereby the host determines its entry point, and then the stack—containing the entry point pointer set to the entry point—may be dynamically loaded.

In any event, the start up code of the first application then executes, reads the host-connected bit (which has been inverted) and decides that a host is connected. As a result, it is assumed that the host has loaded a library, and correctly set the entry point pointer. Thus the entry point pointer 205 is left unchanged.

The dynamically loaded subroutine is called with two machine-word sized parameters. It returns a machine-word sized value. The first parameter is a value that represents an operation to perform, the second a parameter for that operation. Certain operations do not use the second parameter. Similarly, it is not necessary for an operation to utilise the return value. The application will have been provided at the time of writing, with the values representing the operations anticipated as necessary. These values are then used in calling the relevant subroutine from the library.

Alternatively, the library may include a routine translating the values from the application into different values corresponding to those needed by the library.

One such operation will determine whether the host is connected. This operation will be used by the application by calling the input/output library subroutine with the first parameter containing a reserved value, which represents 'host connected operation'. The second parameter is not used by this operation so an arbitrary value may be passed. The subroutine will determine whether the host is connected with an internal action and return one of two possible values, which are 'host-connected' and 'host not connected'.

Similar operations are used to send and receive data from the host, and to specify callback functions in the application to be used by the input/output subroutine in special circumstances.

The two-parameter model provides very good backward compatibility to legacy applications, which cannot be changed. For instance, a later dynamic library may provide additional features. Each additional feature may be accessed by using a value of the first parameter that was not available in earlier libraries. Features that were present in older libraries are provided in the newer libraries and each of these will be accessed with the same value for the first parameter in both old and new libraries. The second parameter remains a 'feature-specific' parameter.

Having provided a mechanism for loading a dynamic library onto a remote system, the same approach is useable to satisfy a wide range of run-time requirements, including but not limited to input/output. An example of such a requirement is the need to provide a work round to a hardware bug that becomes manifest during a debug session. Such bugs may only be present on a particular version or revision of the silicon. Once the problem is discovered, a routine may be written that contains a feature that may be called by the application when appropriate to prevent the bug from occurring, or to mask the bug. This routine may be incorporated within a library on the host, and loaded dynamically into the target at the start of a debug session. Components that do not possess the bug will not require the routine and may be provided with a version of the library that does not have the bug work-round feature. Such a version provides a subset of library functionality such as input/output capability.

Figure 4:
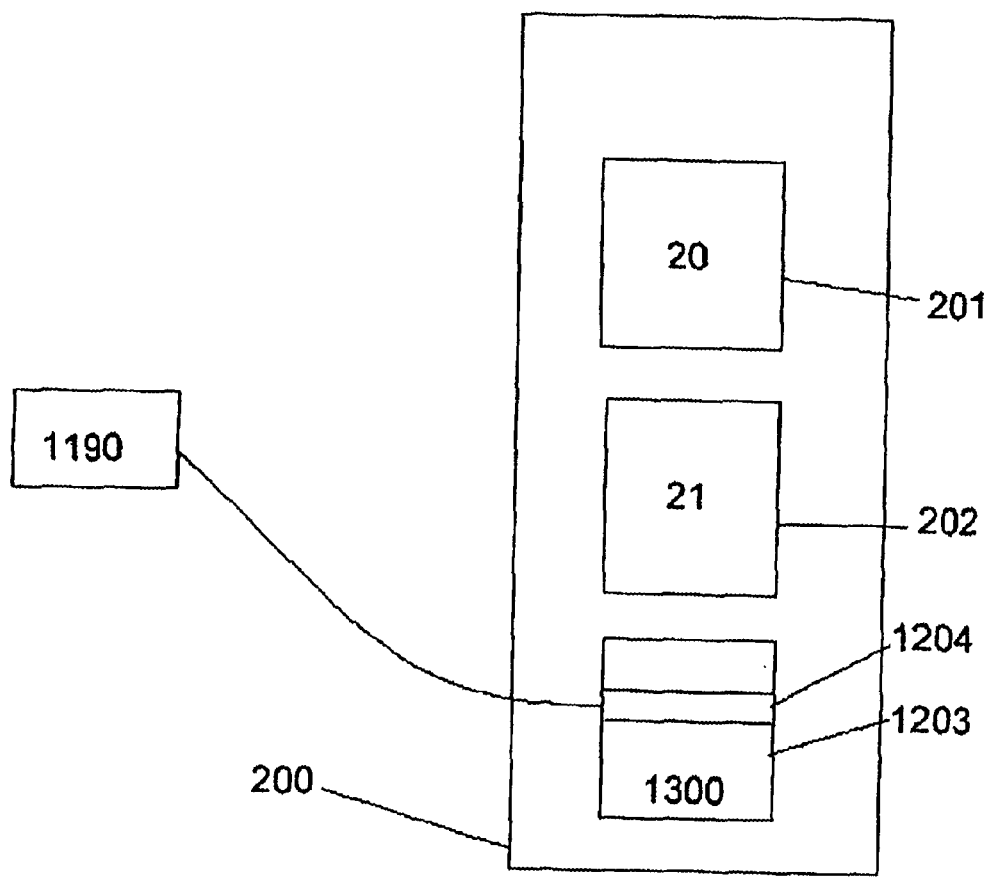
FIG. 4 shows a schematic partial view of the target system showing an alternative way of accessing an entry point of a dynamically loaded library.

In an alternative embodiment shown in FIG. 4, a processor register 1190, which is large enough to contain a pointer, is reserved for use by the input/output system. The digital signal processor vector to an exception handler stack and the pointer at a reserved position of the exception handler stack are not necessary. The register is initialised by the application start-up code to contain the "no library available" value if the host is not connected. If the host is connected, the host places a value in this register pointing to the entry point 1204 of IO dynamic library 1300, which the host has loaded onto the target.

When the application wishes to perform input/output, it looks at the value in the reserved register 1190. If this value is not the special 'no library available' value, it is assumed to be the address of the entry point 1204 to the input/output subroutine. The application calls the subroutine at this address to carry out input/output.

What is claimed is:

1. A method of operating a digital signal processor connected to a host computer, the digital signal processor having a memory including a reserved storage location designated as a vector, the method comprising:
   loading a stack into said memory;
   storing in said reserved location information indicative of said stack location;
   dynamically loading a computer file into said memory; and
   storing at a predetermined location in said stack data indicative of an entry point into said dynamically loaded file.

2. The method of claim 1, wherein said predetermined location in said stack is a reserved location.

3. The method of claim 2, wherein said reserved location is the bottom of said stack.

4. The method of claim 1, wherein said step of loading a stack comprises dynamically loading said stack, whereby said host determines the location in said memory of said stack.

5. A method of debugging a computer system connected to a host computer, the computer system having a memory including a reserved storage location designated as a vector, the method comprising:

dynamically loading into said memory a stack;

storing in said reserved location information indicative of said stack location;

dynamically loading a computer file into said memory for use by said computer system; and storing at a predetermined location in said stack data indicative of an entry point into said dynamically loaded computer file; causing an application to run on said computer system whereby said application accesses said vector to thereby locate said entry point so that said application calls a subroutine in said computer file.

6. A method as claimed in claim 5, wherein the subroutine allows data to be communicated with said host.

7. A method as claimed in claim 5, wherein the subroutine allows said application to work round a hardware error in said computer system.

8. The method of claim 5, wherein the computer system is an embedded system.

9. The combination of a digital signal processor and a host computer, the digital signal processor having a link for connection to said host computer and the host computer being connected to said link, the digital signal processor having a memory including a reserved storage location designated as a vector, wherein the host computer comprises:

first loading circuitry for dynamically loading a computer file into said memory, thereby determining the location in said memory of an entry point into said dynamically loaded file;

processor circuitry for forming a stack, said processor circuitry being operative to store at a predetermined location in said stack data indicative of an entry point into said dynamically loaded file;

second loading circuitry for loading said stack into said memory of said digital signal processor; and writing circuitry for storing in said reserved location information indicative of said stack location.

10. The combination of claim 9 wherein said predetermined location in said stack is a reserved location.

11. The combination of claim 10 wherein said reserved location is the bottom of said stack.

12. The combination of claim 9 wherein said second loading circuitry is operable to dynamically load said stack, whereby said host determines the location in said memory of said stack, and derives said information indicative of said stack location therefrom.

* * * * *